Patented May 24, 1938

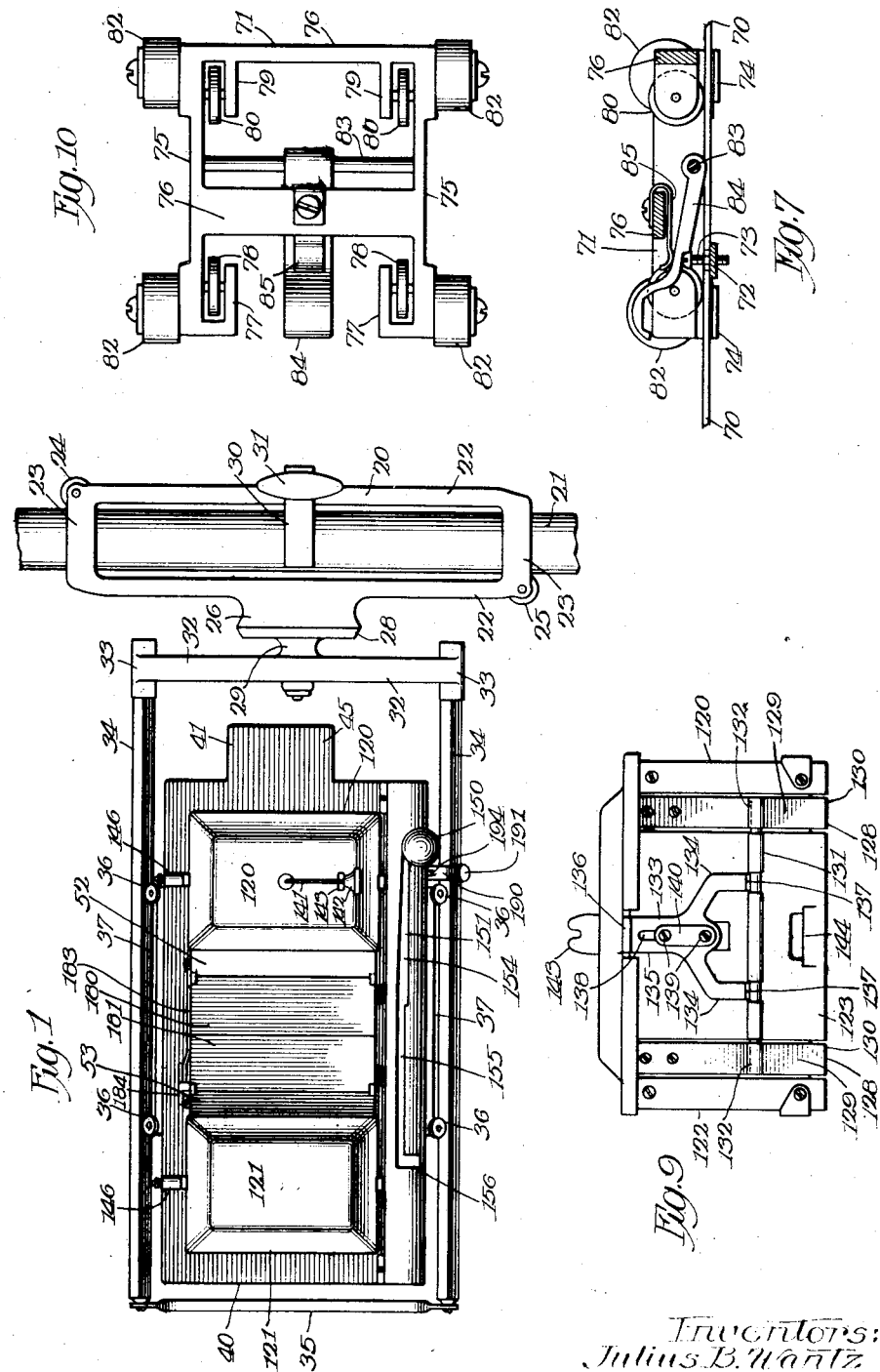

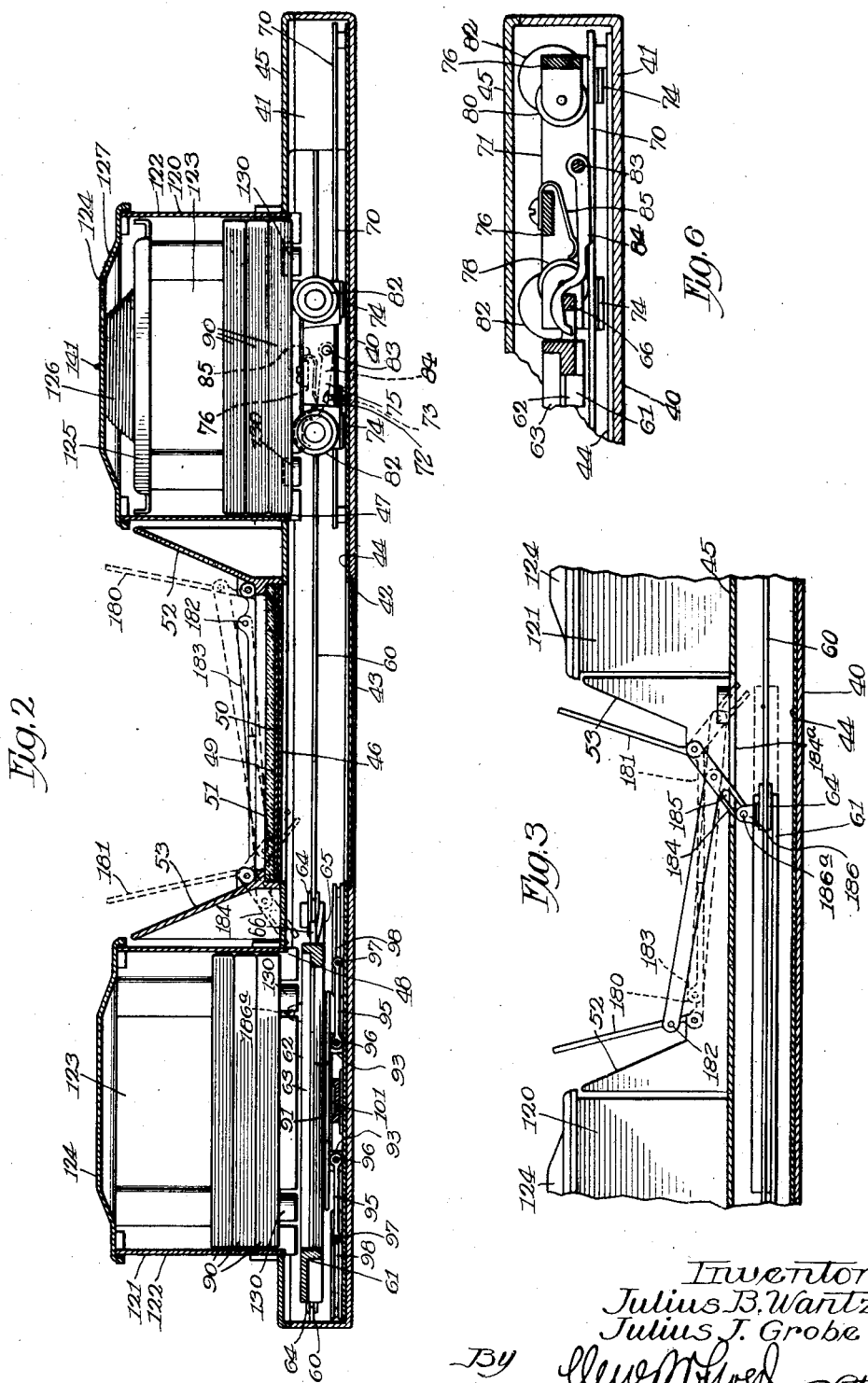

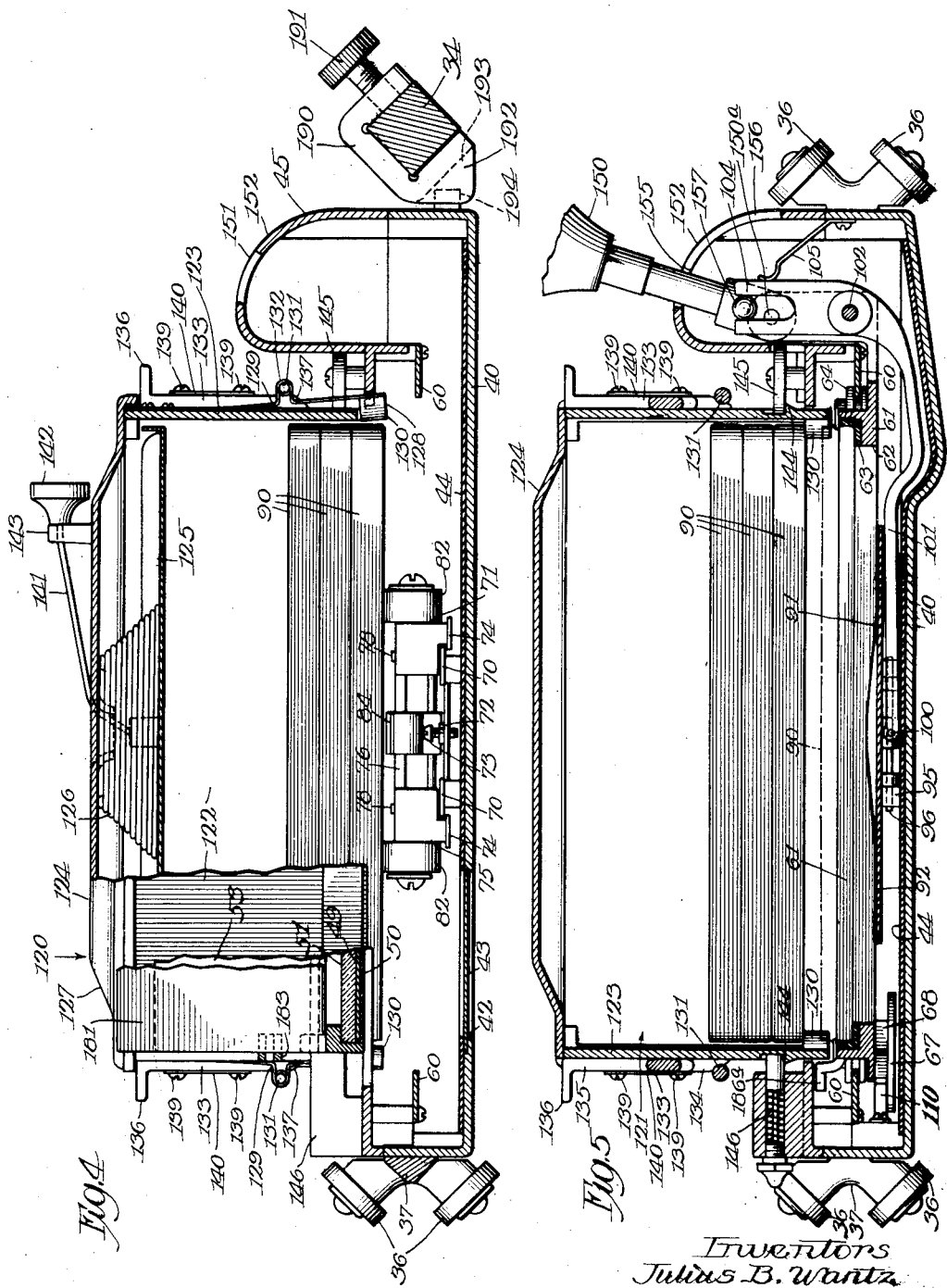

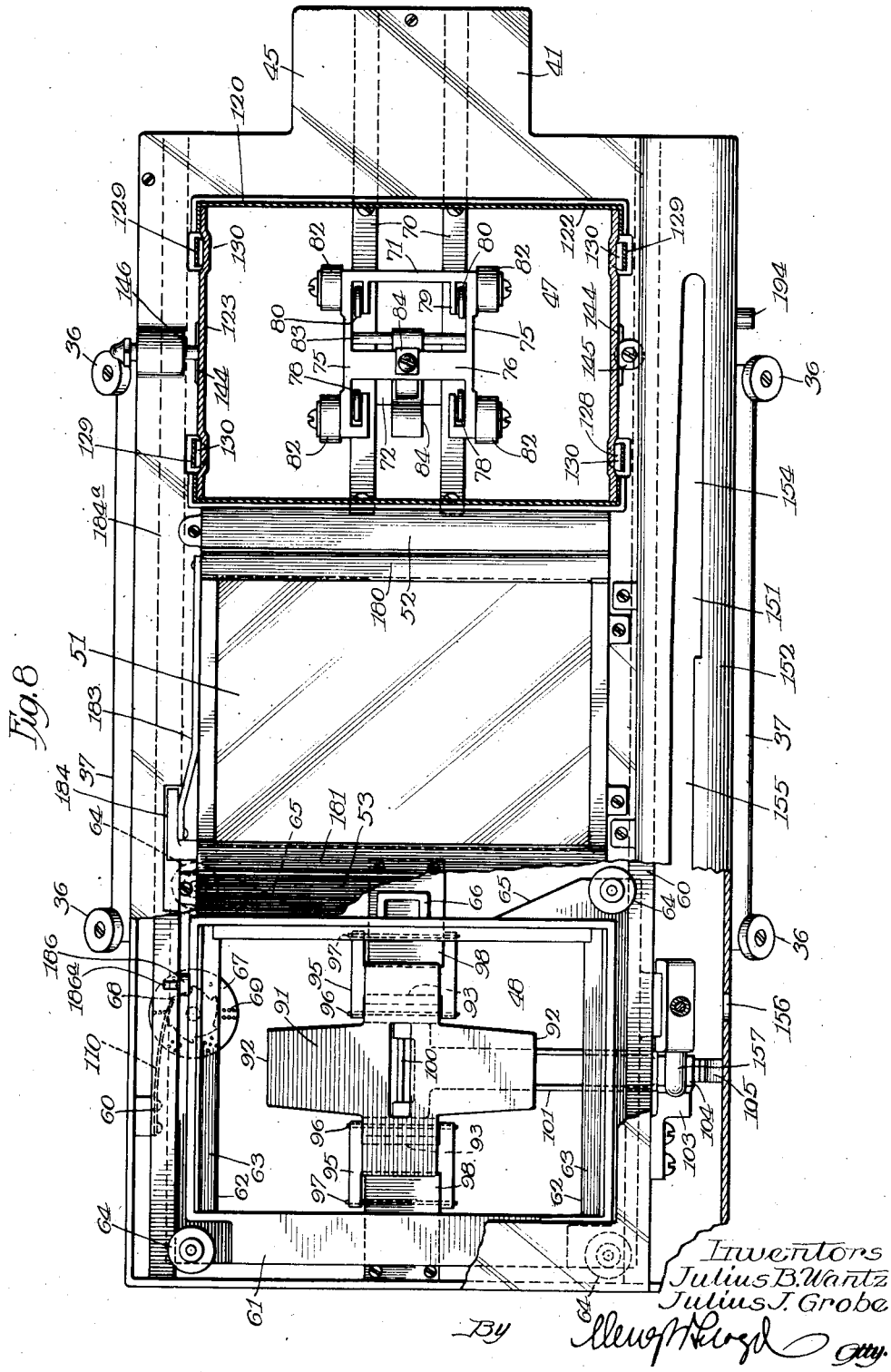

2,118,449

UNITED STATES PATENT OFFICE 2,118,449

SERIAL ROENTGENOGRAM APPARATUS

Julius B. Wantz, Oak Park, and Julius J. Grobe, Chicago, Ill., assignors to General Electric X-Ray Corporation, a corporation of New York Application October 18, 1926, Serial No. 142,223

27 Claims. (Cl. 250—34)

The present invention relates to an apparatus arranged to take series of X-ray photographs, means being provided for the fluoroscopic inspection of the object or objects to be radiographed preliminary to the taking of each of the pictures in series.

Among the objects included in the invention are the following:

New and novel means for obtaining a series of radiographic pictures, such means being of a unique type rendered adjustable to a plurality of angles by its construction and adapted to be used for a great number of purposes;

Improved means for holding a plurality of unexposed films or plates ready to be placed in a position for exposure and means for shifting such plates as required into such position as will permit radiographic exposure in combination with means for receiving the plates after exposure;

The combination with a fluoroscopic screen of a device comprising means for holding a battery of cassettes, and in which the cassettes are adapted to be shifted one at a time into a position for exposure in definite relationship to such fluoroscopic screen;

Unique means for providing serial radiographs in association with means for the fluoroscopic examination of the object or objects sought to be radiographed substantially concurrently with the exposures incident to obtaining such radiographs;

Novel means for shifting a series of films or plates one at a time into a position for exposure, and novel receiving means for collecting the exposed films or plates;

The provision of a highly flexible serial radiographic device possessing substantially universal adjustment in order to obtain satisfactory radiographs under unusual circumstances or conditions;

The combination with a serial radiographic apparatus of interchangeable cassette or plate or film holding portions, such holding portions having means for causing the discharge of cassettes therefrom to be equally effective in all operating positions;

A unique supporting means for a serial roentgenogram apparatus and providing efficient shielding for exposed and unexposed films or plates;

A unique device for supporting a serial roentgenogram apparatus and permitting of directional adjustment, such device including a stand having means admitting of the apparatus being shifted vertically and in a plurality of angles;

The combination with a fluoroscopic screen of a cassette handling and containing mechanism whereby cassettes are brought seriatim into a position for exposure while in registration with said fluoroscopic screen;

The combination with a fluoroscopic screen of a cassette handling and containing apparatus, such cassette handling and containing apparatus including a compartment for cassettes containing unexposed films and a compartment to receive cassettes with exposed films, the device providing means for manipulation of the cassettes one at a time from the unexposed compartment to a position for exposure and from thence to the exposed compartment;

A unique apparatus for holding a plurality of cassettes and for shifting such cassettes seriatim into a position for exposure and for removing each as exposed, the apparatus including means for preventing undue wear upon the cassettes during operation;

A unique cassette holding member comprising a cassette shifting member adapted to receive a cassette before the film therein is exposed, to carry such cassette to a position for exposure of the film, and to remove the cassette from the latter position, such means including a novel carriage adapted to prevent cassettes from becoming jammed within the apparatus even though it is desired to transfer a cassette from a position ready for exposure back to its original unexposed position;

A unique cassette shifting apparatus including a holder for unexposed cassettes and a receiver for exposed cassettes, such apparatus including a carriage adapted to register with and support the unexposed cassettes during the time when one of the cassettes is being exposed and being adapted to permit the return of a cassette which has been placed in position for exposure to the holder without disturbing the relative position of the other unexposed cassettes;

A novel apparatus adapted to be used in conjunction with the serial roentgenogram device, providing means for numbering the exposed films or plates, the device being inoperative while cassettes are being shifted from an unexposed position to a position for exposure, and being actuated only subsequent to actual exposure of the film or plate;

A unique means for moving cassettes in a holder adapted to be used in the serial roentgenogram apparatus whereby the apparatus will be made to operate with equal effectiveness irrespective of the position assumed for producing; and A portable serial roentgenogram apparatus comprising an independent unit and adapted to be used upon a standard or other device provided therefor, and capable of being made a part of an X-ray table or other standard X-ray equipment.

These objects, and such other objects as may hereinafter appear, are obtained by the novel construction of the various elements of the apparatus, by their combination with one another, and by the arrangement of the parts thereof. One form of the invention is disclosed in the accompanying drawings, hereby made a part of this specification, and in which:

Figure 1 is an elevation of the device in vertical position on a stand, only a part of the latter being shown;

Figure 2 is a longitudinal section of the body of the device, the shutters for the fluoroscopic screen being closed;

Figure 3 is a fragmentary longitudinal section showing the shutters for covering the fluoroscopic screen in open position and taken from the opposite side of the device from Figure 2;

Figure 4 is transverse section of the apparatus through the cassette holding end;

Figure 5 is a similar section at the cassette receiving end;

Figure 6 is a fragmentary longitudinal section of the extension portion of the body as shown in Figure 2, the cassette support being in connection with the cassette carrier;

Figure 7 is a substantially similar view of the cassette support shown in Figure 6 but disconnected from the cassette carrier;

Figure 8 is a plan view of the body of the apparatus partly in section, the sections being in different planes at opposite ends of the figure;

Figure 9 is an end elevation of a cassette holding member; and

Figure 10 is a plan view of the sliding support for the cassettes disposed in the holding end of the apparatus.

Like reference characters are used in the drawings and in the description which follows to indicate similar parts.

In the disclosed embodiment of the invention, the apparatus is adapted to be disposed upon a support provided therefor. It is quite manifest from an examination thereof, however, that the apparatus may be mounted upon an X-ray table or otherwise adapted for use in the laboratory, clinic, or X-ray room.

When a standard is used, a device having a plurality of feet is ordinarily provided. Each of the feet on the standard may have a leveling device, and carry casters adapting the apparatus to be readily shifted. It is well to have the support for the device such that the device will operate in a horizontal plane.

Means for locking the stand against shifting may be provided upon the supporting device. Such features are conventional in X-ray tube stands and do not form per se a part of the invention, but are mentioned to show the flexibility of the apparatus. Shifting after positioning of the apparatus, should, of course, be avoided, hence a locking means is suggested.

If a standard is employed, a counter weight for the apparatus has considerable utility. To the counterweight may be attached a flexible member passing over a pulley upon the standard. The flexible member is adapted to be attached to a skeleton sleeve (see Figure 1) which skeleton sleeve provides a carriage for the apparatus comprising the subject matter of this application for patent.

The sleeve as shown in said Figure 1, comprises in the preferred form a casing 20 having at one side a hook member (not shown) for receiving the end of the flexible member (also not shown) to which the counterweight (within the standard 21) is attached. Said skeleton sleeve 20 comprises opposite vertical members 22 and ring members 23 at the end of said vertical members.

On the top ring member 23 is a large friction bearing 24 having a concave periphery and which is journalled in said ring member 23 for the purpose of engaging the standard 21 and supporting the principal weight of the apparatus. At approximately 120 degrees to either side of the friction bearing 24 are smaller bearings (not shown), each disposed upon a small bracket secured to the ring member 23 and providing additional support for the skeleton sleeve 20.

In the lower portion of the sleeve 20 and in the lower ring member 23 thereof is a second roller bearing 25 like the previously described bearing 24, but at the opposite side of the sleeve 20. At an angle of 120 degrees from said second bearing 25 and at each side thereof disposed upon brackets, are two small roller bearings (not shown) similar to those heretofore described. A freely moving sleeve 20 is thus provided, the larger roller bearings 24 and 25 being disposed at opposite sides of the sleeve 20 and in a position to provide the principal support for the remainder of the apparatus shortly to be described.

The outer vertical member 22 of the skeleton sleeve 20 carries no apparatus (except that a locking means may be secured thereto) and differs from the inner vertical member 22 which has an enlarged portion 26 at approximately its middle. The cassette carrying apparatus is adapted to be disposed upon a horizontal axis extending from the enlarged portion 26.

The axial support for the cassette carrying apparatus includes an enlarged portion 28 forming a friction joint with part 26 and terminating in a lateral lug 29, and to this lug 29 is secured the serial roentgenographic apparatus providing the principal subject matter of this application.

Affixed in any suitable manner to the frame 20 are jaws 30 adapted to be moved toward and away from the standard 21, and having in conjunction therewith manually actuated means, such as handle 31, for moving such jaws in one or the other of two directions, whereby to provide means for releasing said jaws 30 from the standard 21 when it is desired to shift the apparatus vertically, upwardly, or downwardly, upon said standard 21.

As indicated, the first mentioned enlarged portion 26 of the inner vertical member 22 is one part of a friction joint, the joint disclosed in the drawings comprising two disk-like members having their flat, adjacent faces in close proximity. Means may be provided whereby the adjacent surfaces of the friction joint may be brought closer together or separated to provide an adjustment fixing the force required for moving the apparatus about its axial support.

The disk adjacent the vertical portion of the skeleton sleeve is, of course, stationary, while the other disk is adapted to be moved relatively thereto and carries as an integral part thereof (in the preferred form) arms 32 of equal length and terminating in lugs 33 which provide means for securing thereto track members 34, rectangular or square in cross section.

Said track members 34 are disposed in a manner which provides a support for roller bearings disposed at an angle of 90 degrees to one another and said members are held at their outer ends by a spacing member 35, which spacing member 35 comprises a bar-like portion having extensions at an angle thereto, the purpose of using such a construction being to permit of the body of the apparatus to be shifted in part beyond said spacing member.

The apparatus proper for shifting cassettes will now be described. As has been previously pointed out, the track members 34 are arranged to provide means for supporting roller bearings 36 at an angle of 90 degrees one to another.

Said roller bearings 36 are carried upon a bar-like member 37, which member has at its ends short projecting arms terminating in axles disposed at a 90 degree angle to one another. Upon these axles are disposed roller bearings 36 having flat bearing surfaces, which roller bearings are secured in a manner permitting of their free rotation, a screw and washer being suitable for this purpose.

Two or more pairs of roller bearings at each side of the device are thus provided, such bearings being adapted to prevent the displacement of the apparatus from intermediate the two track portions 34, for a portion of the bearings engage the tracks 34 at one side thereof and another portion engage the opposite side of said tracks at all times.

The body of the apparatus comprises a metallic portion which may be formed by a casing 40 which is more or less pan-shaped and has at the end adjacent the standard 21, an extension portion 41, the purpose of which will later appear.

From approximately the center portion of the body member 40 is cut an aperture 42 which is closed by a thin sheet of aluminum or other material 43 highly transparent to X-rays (or which has a low absorption value with respect to X-rays). The body portion 40, except over the aperture 42 just referred to, is lined with lead 44 of a suitable thickness, whereby to render the body portion, except at the aluminum window 43, opaque to X-rays.

The body portion is closed by a cover member 45 upon which cover are disposed the principal parts of the cassette receiving and holding members. The cassette shifting parts are mounted intermediate the cover 45 and casing 40.

Said cover member 45 is provided with three windows, or openings, the middle window portion 46 registering with the aluminum window 43, the two end openings 47 and 48 therein providing means for ingress and egress of cassettes.

Over the middle aperture 46 is disposed a fluoroscopic screen 49 including a frame 50 supporting said fluoroscopic screen and a protective covering of lead glass 51.

Integral with the cover 45 and adapted to form a shield preventing X-ray emanations and secondary radiation therefrom from penetrating the unexposed films at one edge of the fluoroscopic screen, and the exposed films at the opposite edge thereof are two obliquely disposed extensions 52 and 53.

The fluoroscopic screen portion comprising parts 49, 50, and 51, is adapted to be formed in a unit by itself and attached to the cover portion 45 by screws or other suitable fastening means. It is readily removable to permit of access to the interior of the body portion 40.

At the opposite sides of the body or casing 40 are two tracks 60 co-extensive therewith. Upon these tracks is a cassette carrying member 61, and it is this member which permits of the cassette being carried from an unexposed position to a position for exposure, and from thence to a receiving section, to be held until removed from the apparatus.

The cassette carrying member 61 comprises a rectangular skeleton frame having on at least two sides thereof inwardly extending ledge portions 62 to support a cassette. Upon these ledge portions may be placed fibre strips 63 upon which cassettes (which generally are made of aluminum) are adapted to be seated. The fibre 63 prevents scratching and other mutilation.

Wheels 64 are preferably disposed upon the cassette carrying member 61, upon extension portions 65 thereof at the corners or within depressed portions, as may be preferred. A wheel 64 is generally disposed at each corner of the cassette carrying member 61, and each wheel may be provided with ball bearings for the purpose of permitting easy shifting of said cassette carrying member 61.

At the side of the cassette carrying member 61 adjacent the standard is a lug or ear 66, the material of which is removed to provide a latch engaging portion.

At the top or bottom of the cassette carrying member 61 and operating in a plane parallel to the cassette, is a circular disk 67 having as a part thereof a plurality of spaced teeth 68, forming a ratchet. The toothed portion 68 of the wheel 67 is of less diameter than the circular disk portion thereof, and between the tooth portion 68 and the periphery of the disk 67 and at spaced intervals, a number of small holes 69 or other insignia are punched. When holes are employed, the holes may provide a general concept of an ordinal as 1, 2, 3, 4, 5, and 6.

As representative of the Figure 1, however, one hole may be punched. To represent the numeral 2, two holes may be punched. A tight bearing is adapted to hold the disk 67 and ratchet 68 against accidental movement.

In the case intermediate the fluoroscopic screen portion thereof and the end adjacent the standard 21, there are disposed in said case parallel elevated tracks 70 upon which a sliding member 71 is disposed. The tracks referred to extend into the extension portion 41 of the casing 40. The tracks 70 just referred to are elevated so that they have a free edge at the outside.

A transverse member 72 is disposed intermediate said tracks 70 and is provided with an adjustable cam or latch engaging member 73. Upon the tracks is the slidable or movable member 71 which may be called a cassette support or sled, and which comprises lugs 74 extending under the outer edges of track 70 and parallel side members 75 separated by transverse members 76, the whole member 71 being formed, when desired, in a single casting.

At one end, the parallel members 75, which form the side portions of this part of the device, have inwardly turned portions 77 between which bearings 78 adapted to ride upon the tracks 70 are disposed. At the other end of said member 71, one of the transverse members 76 carries lugs 79 parallel to side members 75, and another pair of bearings 80 for the support of member 71 is journalled between the side pieces 75 and said lugs 79. Member 71 is also designated a trailer.

At each corner of the slidable member 71 are fibre rollers 82, the periphery of which extends above the plane of the top of sled 71, whereby to provide a roller bearing support for cassettes and to prevent such cassettes as are used in the apparatus from coming in direct contact with the slidable member. It will shortly be evident that the sled 71 is adapted to be pulled under a stack of cassettes and subsequently pushed from thereunder during the operation of the device, and that while freely movable upon tracks 70, can not be displaced therefrom.

A bar member 83 pivotally mounted at its ends between the side members 75 of said slidable member 71 and having secured thereto a latch 84 is provided, such latch member 84 being adapted to engage upon the adjustable cam 73 heretofore described, when the cassette carrying member 61 heretofore described is moved away from that portion of the apparatus wherein cassettes holding unexposed films or plates are stored.

Upon one of the transverse members 76 of the sled 71 is a leaf spring 85 which is adapted to engage the latch member 84 just referred to, and to force said member 84 toward the bottom of the casing 40, and outwardly from the slidable member 71.

When the cassette carrying member 61 is moved in a direction toward the standard 21, the lug portion 66 at the side thereof acts as a cam to lift the latch member 84 upon the slidable cassette supporting sled 71, such latch 84 normally resting upon the adjustable cam 73 heretofore described when the latch 84 is detached from ear or lug 66. The camming action of the lug 66 upon the cassette carrying member 61 raises the latch 84 and causes its end to engage upon the cassette carrying member 61 at ear 66 with the result that the cassette carrying member 61 and the cassette supporting member 71 move in unison during the entire time that the cassette carrying member 61 is removing a cassette from the stack of unexposed cassettes to a position for exposure.

Just previous to the time when the cassette within the cassette carrying member 61 reaches a position for exposure beneath screen 49 and frame 50, the adjustable cam 73 is engaged by the latch member 84 and the latch 84 is released from the cassette carrying member 61, the spring 85 upon the cassette supporting member 71 and the adjustable cam 73 causing the cassette supporting member 71 to remain in a stationary position with the latch 84 locked upon cam 73 until the cassette carrying member 61, after discharging an exposed film, is returned to the side of the apparatus adjacent the standard for the purpose of being reloaded with another cassette intended to be exposed.

In order to prevent the cassette supporting member 71 from being displaced from the tracks 70 provided therefor, lugs 74, or removable members, washers, or other means, may be employed whereby to hold said cassette supporting member against accidental displacement. When the cassette carrying member 61 is in the extreme right hand position which it may occupy, (Figure 6) and that is the position at which it will receive a cassette from the magazine holding the unexposed cassettes, the cassette supporting member 71 is forced into the extension 41 of the body portion heretofore described. The purpose of the extension 41 is to provide space to receive the cassette supporting member 71 when the latter is not functioning as a support.

On the discharging side of the apparatus, the left side of Figure 8, means are provided for discharging a cassette having an exposed film or plate therein from the cassette carrying member 61. In the present device means are provided for lifting the cassette and to force it into a receptacle, chamber, or box, so that the cassettes with exposed films therein may be removed, as a group, when a series of roentgenograms has been exposed.

The cassette elevating member for discharging cassettes 90 when containing exposed films or plates into a receiving magazine, comprises a cross-like body portion 91 having arms 92 at ninety degree angles and at the under side two parallel lug portions 93. Said body 91 is adapted to be projected perpendicular to the path of movement of the cassettes from one end of the device to the other, and to push the cassette containing an exposed film into magazine 121. At opposite sides of said body are two H shaped guide members 95, through which a pin 96 is passed, said pin 96 passing through the lug portion 93 heretofore described.

At the opposite end of said H shaped members is a second pin 97 extending thereacross. Said second pin member 97 is adapted to travel in a stationary guide portion 98 comprising a strip of metal or other suitable material bent to form parallel sections, an elongated U-shape, the pin 97 traveling intermediate the two layers of material thus provided. Said links 95 because of their limited angular movement controlled by pins 96 and 97, the latter being confined in tracks or guides 98 shortly to be described provide the means for holding the top of body 91 parallel to the surface of member 40 at all elevations. As body 91 is moved the pins 96 form the axis for angular movement of links 95 which are joined to body 91 thereby. At the other end of said links 95 is the pin 97 which travels for almost its entire length in the tracks or guides 98, preventing tilting of the arms 92 of the body 91, in either direction.

The H shaped members 95 being secured at one end to the cassette lifting member 91 and having a transverse pin guide portion 97 adapted to travel in tracks or guides 98 tending to hold them in a single plane, results in forcing the body 91 of the cassette lifting member to rise with its top surface parallel to the body 40 of the apparatus, and thereby angular displacement of the cassette lifting portion 91 is wholly avoided. The cassettes 90 are lifted while maintaining their front surfaces parallel to the casing 40.

Intermediate the lugs 93 which support the two H shaped members 95 and at an angle of ninety degrees thereto, is a third bar-like or pin member 100, which provides a pivot connection for an arm 101 extending transversely to the body 40 of the apparatus. Said arm 101 is pivotally supported at 102 adjacent its outer extremity, the pivot support 102 comprising a bracket 103 secured to the body 40 of the apparatus.

That portion of the arm 101 beyond the pivot support 102 comprises a U shaped section 104, the purpose of which will later be apparent. A spring 105 engages the U shaped portion, whereby the cassette lifting member 91 is normally held close against the body 40 of the apparatus, such spring 105 being of sufficient tension to maintain said cassette lifting member 91 in its normal position, even when the entire apparatus is turned upside down.

Upon the left hand side of the body 40 (Figure 8) is a spring member 110 adapted to engage the ratchet 68 upon the counter wheel 67 heretofore described. Said spring member 110 is adapted to move said ratchet 68 one tooth at a time, when the cassette carrying member 61 is moved beyond the position occupied during exposure and towards the discharging end of the apparatus. When the cassette carrying member 61 is returned to the opposite or receiving end of the apparatus, the spring 110, passes harmlessly over the ratchet 68.

Thus the film marking apparatus of the device is adapted to be actuated only when a film has been exposed and has been moved to the part of the apparatus from which the exposed films are removed; hence the counting of the cassettes or the numbering thereof is not disturbed when the operator moves a cassette into position for exposure and changing his mind, returns the cassette 90 to the magazine or box for unexposed cassettes.

It is evident that the material of the disk 67 actuated by ratchet 68 is such that it offers some resistance to the penetration of X-light, hence, each film or plate in cassettes 90 as exposed is marked by the effect of X-light passing through the perforation 69 in disk 67 and not through the disk proper.

The apparatus is adapted to use a standard type of cassette. Such cassette 90 comprises a body of material having a low co-efficient of absorption of X-rays. The sides may be integral with the body or may be attached thereto by any suitable means. A suitable removable back may be provided, and such back carry with it latch means for securing a film within the cassette. The style of cassette illustrated and described is conventional.

In order to have a plurality of cassettes in a position for ready use in connection with the apparatus, a box or magazine 120 is provided at one side thereof to contain the cassettes 90 holding unexposed films. At the opposite side of the apparatus is a box or magazine 121 adapted to receive the cassettes 90 containing exposed films. These boxes 120 and 121 may be interchangeable, as will be manifest from the description which follows, or one may be constructed without a follower, one form of which is hereinafter described.

One of the great conveniences of an apparatus of this kind, in addition to the adaptability thereof to the taking of a series of radiographs in quick succession, is that the boxes or magazines 120 and 121 of unexposed and exposed films provide a convenient means for the transport of the loaded cassettes 90 from a dark room to the apparatus. The operator may fill his cassettes 90 in the dark room, dispose of the cassettes in the receptacle 120 therefor, place the receptacle 120 in the apparatus, make exposures one at a time, discharge the cassettes 90 with the exposed films into a second receptacle 121, and when all of the films have been exposed, remove the second box 121 and convey it back to the dark room.

This does away with the handling of cassettes individually. Suitable fastening means are provided upon the boxes or receptacles 120 and 121 used in this apparatus whereby these cassettes 90 may be conveniently retained within the boxes during the period of the transportation thereof.

In the present apparatus the magazines 120 and 121 employed are of parallelopiped configuration. Each has sides 122 and ends 123 of suitable height, the height of the sides and ends determining the number of cassettes which may be contained therein. A suitable cover 124 for the sides and ends is provided, and a movable follower block is secured therein. As indicated previously, the follower block may be omitted from the discharging magazine.

In the present apparatus the follower block comprises a sheet of aluminum or other like material 125 to which is secured a spiral spring 126, said spring being anchored upon the top of the receptacle. Said top 124 has a raised portion 127 therein to provide room for spring 126 when the receptacle 120 (or 121) is fully loaded. At each end 123 of the magazine are latch members 128 for the purpose of holding the cassettes 90 contained therein against accidental displacement.

Such latch members comprise flat springs 129 anchored adjacent the top of the receptacle 120 (or 121) and having inwardly extending portions or lugs 130 at the bottom, which lugs provide the cassette engaging parts thereof.

Ordinarily four such springs 129 are used, two at each end 123. For releasing cassettes 90, a cross bar 131 extending intermediate the flat springs 129 at each end of the box is provided. Said cross bar 131 is adapted to be inserted at its outer ends in a bent or folded section 132 of the material of the spring. Each of said cross bars is round and has grooved sections adjacent its ends.

The springs 129 are released from engagement with cassettes by being forced outwardly from the ends 123 of box 120 (or 121) and in order to force said springs outwardly, a slidable member 133 comprising a body and bifurcated ends 134 is provided. At its upper end, the body 135 of the member 133 has an outwardly directed extension 136 for the ready gripping of this member by the hand.

The bifurcated ends 134 have a cam end surface 137 and the cam surface 137 of the bifurcated end is adapted to pass between the cross bar 131 and the end 123 when the member 133 is pressed downwardly. The cam ends 137 engage the cross bar 131 at its grooved portions. In this manner the cross bar 131 is forced outwardly, carrying with it the springs 129, thus disengaging the ends 130 of said springs from the cassettes contained within the box 120 or 121. The sliding member 133 has a slot 138 therethrough and screws 139 or other suitable guide means are inserted therethrough to hold said member 133 in position on the box end 123.

It is manifest that the two ends may be released separately and independently. Suitable means 140 may be provided for holding the slidable member 133 actuating the springs 129 in one or the other of two possible positions, the first being that of release of the springs 129 when the cassettes will be held by said springs within the box, and the other being that where the springs are forced away from the cassettes 90 and said cassettes are allowed to drop into the apparatus in the regular way.

If the apparatus was always to be employed in a horizontal position, there would be no necessity for the follower block 125 and spring 126. But the apparatus is adapted to be used and is intended for use in a vertical position and in many angular positions, and a follower block and spring, or its equivalent, is desirable.

As the apparatus will operate on the force of gravity when in a horizontal position, means are provided for removing the spring pressure upon the follower block 125. This means comprises a cable 141 attached to the follower block 125 and having a handle 142 at its outer and free end. Upon the top of the box 120 (or 121) is a yoke 143 into which the cable 141 is adapted to be inserted when the follower block is pulled to its uppermost position, a hole being provided in the center of cover 124 to provide a passage for cable 141. The handle 142 may then be made to engage the yoke 143 whereby to prevent the follower block 125 from being operative.

The lug ends 130 of springs 129 also afford a means for preventing the follower block 125 from being projected outside of box 120 (or 121) for normally, if the box be empty, the follower block 125 rests upon said lugs.

In order to rapidly load a holder 120, cassettes 90 should be stacked in a desired number. The holder 120 then should be slipped thereover, and the springs 129, previously forced outwardly, should be released. The holder 120 is then adapted to hold cassettes 90 against displacement and to be carried to the apparatus.

Box 120 is secured thereto by lugs 144 and 145 and a latch member 146. Upon the opposite ends 123 of the box 120 (or 121) the lugs 144 are located while upon one side of the apparatus are lugs or ears 145 adapted to engage lugs 144 and upon the opposite side are spring actuated catches 146 adapted to engage the lugs 144 at the other end 123 of the magazine.

A second receptacle 121 which may be identical with the one just described, and which box is adapted to receive the cassettes after the exposure of the film therein, may be placed at the other end of the apparatus. The box 121 may be made without the follower block 125 and its attendant parts.

When the cassette holding member 120 is disposed upon the apparatus, the spring members 129 holding the cassettes are released by pressing downwardly the bifurcated member 133. For moving cassettes 90 from the receiving end of the device, magazine 120, to a position for exposure, and from thence to the discharging position, a handle member 150 pivotally secured at 150a to the cassette carrying member 61 is provided.

In order that the apparatus may be correctly manipulated by the handle member 150, a track 151 is provided upon the casing top 45 of the device. Said track 151 includes a portion 152 of half rounded configuration open at the under side and having through its closed side the slot 151 for the handle 150 just referred to. The slot has three sections, 154, 155, and 156 and the handle 150 may be operated, by transverse and longitudinal movement from one end of said slot 151 to the other end.

A cassette 90 having dropped into the cassette carrying member 61 either because of the force of the spring 126 back of the follower block 125 at the top of the stack of cassettes or by force of gravity, the handle 150 is moved in a left hand direction (Figure 8) through the first section 154 of casing 152, said section 154 being the wide section of such slot.

When the handle 150 has reached the end of slot 154, it is stopped by the projection or shoulder which marks the termination of such slot section 154, and the commencement of the next narrower slot section 155. When the handle 150 is at this point, the cassette 90 is in a position for exposure.

As soon as the film in the cassette 90 in position for exposure shall have been exposed, the handle 150 is lifted, and then moved along the narrowest portion 155 of the slot 151 in the casing 40 until the handle strikes the transverse portion 156 therein, where the handle may be pressed downwardly. The higher voltage impressed upon the tube is shut off when the exposure has been completed.

When the handle 150 has reached the end of the track portion 155, a lug or pin 157 on said handle 150 passes into the bifurcated end 104 of the arm 101 adapted to operate the cassette lifting member 91 and with the application of downward pressure upon the handle 150, such cassette lifting portion is actuated to lift the cassette 90 upwardly into the cassette receiving box, there to be held until said box is removed to the dark room. In the magazine 121, the springs 129 are allowed to rest against the ends 123 of the magazine, and a spring catch for the cassettes 90 as lifted is thus provided.

The track of transverse travel of the cassettes 90 into the discharge magazine 121 is such that each cassette engages the rounded ends 130 of the springs 129 so that when the cassette 90 reaches the discharge box 123, it has outwardly forced the ends of said spring members.

The lifting motion of the cassette lifting parts therefore merely causes the cassette 90 to be pushed upwardly beyond the lug ends 130 of the springs 129.

In describing this apparatus, it must be recalled that while fluoroscopic examinations are being made a certain amount of X-light is projected into the face of the operator. One would think that when the higher current, that is the radiographic current is supplied, stronger X-light would be thrown into the face of the operator. It should not be overlooked that each of the cassettes carries a shield preventing the penetration of X-light therethrough and this is a protection to the operator.

The cassette 90 with its shield impervious to X-light entirely covers the aperture 46 in the case 40 of the apparatus and this aperture 46 is completely closed against X-ray emanations.

It is desirable, however, because of the probability of avoiding X-ray burns from negligence or carelessness of operators who switch on the higher current when no cassette 90 is in position to provide a shield adapted to be used in conjunction with the apparatus to cover the back of window 46. This will shortly be described.

One form of shutter for covering the back of window 46 is disclosed in Figures 2 and 3. This form is also shown in other figures in the drawings. Two shutters 180 and 181 are disclosed. These are pivoted or hinged adjacent the intersection of the wings 52 and 53 with the top 45. Any suitable pivoting or hinging means may be employed, it being desirable only to prevent the shutters 180 and 181 from being moved out of alignment.

The left hand shutter 180, Figure 3, has a trunnion 182, to which is pivoted a link 183. The right hand shutter 181, Figure 3, has a more extensive arm 184 having a slotted end 185, the link 183 being pivotally connected to the arm 184. There is a slot 184a in the cover 45 through which the arm 184 is adapted to project inwardly.

The operation of the two shutters 180 and 181 is made evident by an examination of Figures 2 and 3. In connection with the cassette carrying member 61 is a bracket 186 to which is attached a laterally extending pin 186a. As the handle 150 is moved from the right to the left (Figure 2) and as the cassette 90 is moved from the loading magazine 120 to a position for exposure, the handle 150 through the action of the pin 186a just referred to, engages in the slotted end 185 of the arm 184, and moves said arm 184 in a counter-clockwise direction whereby to close the left hand shutter 181 by direct actuation thereof and to close the right hand shutter 180 through the agency of the link 183 pivoted at 182 upon said right hand shutter 180.

Further movement of the handle 150 to the left, (Figure 2) disengages the handle 150 from the shutter actuating mechanism, and continues the closed position of the shutters 180 and 181. After the cassette 90 is moved into the unloading magazine 121 and while the handle 150 is being returned to its position at the right hand side of the device (Figure 2) the pin 186a again engages the arm 184, and by reversing the movement above described, opens the shutters 180 and 181.

For the purpose of preventing movement of the apparatus after it has been adjusted upon the tracks 34, a somewhat flexible locking member is interposed therebetween. This member is best illustrated in Figures 1, 4, and 5.

It comprises a yoke 190 having a locking screw 191, the yoke being adapted to ride upon the rail 34 to any desired position therealong. When a selected position is obtained, the locking screw 191 is adjusted to fit tightly against the rail 34.

In its construction, the locking yoke 190 is generally U-shaped, the rail 34 being adapted to ride within the cut-out material intermediate the arms of the U. For facilitating movement and preventing undue friction, each of the inner corners of the opening in the yoke is enlarged.

The inwardly extending portion 192 of the locking yoke 190 is grooved longitudinally to provide a narrow track 193 which has a direction transverse to the rail 34 and the casing 40. Upon the casing 40 and at the edge thereof, a machine screw, lug or other device 194 is provided and is secured rigidly thereon. The head of said lug, screw or other device 194 is adapted to ride with relative freedom within the track 193 provided by the longitudinal groove just referred to.

In adjusting the device, the locking screw 191 is released and the device moved longitudinally upon the tracks 34, until the selected position is attained. The locking member 190 rides the rail 34 concurrently with the movement of the casing 40 therealong. Upon attaining the desired position, the operator tightens the lock screw 191 against the rail 34, and the casing 40 is thus prevented from being moved on the tracks 34 although flexibly secured thereto rather than immovable thereon.

A complete cycle of operations showing the manner in which the device is operated is in order. The device should be placed in a properly selected position. It is locked therein by yoke 190 and set screw 191. In the magazine 120, a number of cassettes 90 loaded with films ready for exposure are placed face down. The springs 129 are released to hold the cassettes 90 within the casing 120 until said cassettes 90 can be moved from the dark room to the apparatus. The magazine 120 is attached to the apparatus by the locking means provided therefor.

If the cassette carrying means 61 at this time is not beneath and registering with the window 47 over which the chamber 120 is seated, the sled 71 will be in position to provide a support for the cassettes 90, the instant the springs 129 are forced outwardly or the cassettes 90 within the chamber 120 unlocked from their position therein.

Movement of the handle 150 in a right hand direction, Figure 2, will force the sled 71 from beneath the stack of cassettes 90 and allow the cassette carrying member 61 to register with the lowermost cassette 90 which lowermost cassette will drop or be forced into position upon the cassette carrying device 61.

Movement of the handle 150 the length of slot 154 causes the lowermost cassette 90 to be moved into a position under the fluoroscopic screen 46 and to register with the windows 42 and 46. As the cassette carrying member 61 is moved in such left hand direction, the sled 71 is pulled from the end 41 and under the next lowermost cassette 90 in chamber 120 and remains in position thereunder until the cassette carrying device 61 is returned to the right hand side of the device to pick up said next lowermost cassette 90.

A connecting means is provided between the cassette carrying member 61 and the sled 71 whereby the sled 71 is separated from the carrying device 61 when the sled is in a position to support the cassette within the chamber 120 and is directly thereunder. Said sled 71 is locked in this supporting position during all the time it is disconnected from the cassette carrying member 61.

If the device is other than in a horizontal position the spring 126 actuates follower block 125 in chamber 120 whereby to force the cassettes 90 toward and into intimate engagement either with the cassette carrying device 61 or the sled 71.

As an incident to the transfer of a cassette 90 from the magazine 120 to registration with the aluminum window 43 the shutters 180 and 181 are closed, such closure being incident to the actuation of the cassette carrying member 61, the shutter actuating mechanism being engaged by an operating member upon said member 61.

The handle 150 is moved to the left until the end of the slot 155 is reached when the handle 150 is given a downward impulse, which amounts to a transverse movement, and the cassette 90 which is already partially within the receiving chamber 121 is forced wholly therein by the upward movement of the cassette lifting member 91. The spring members 129 on holder or magazine 121 with their rounded ends 130 provide catch means whereby the elevated cassette 90 is maintained in a position sufficiently high in the chamber 121 to prevent interference when the next cassette 90 is about to be discharged thereinto.

As an incident to the movement of the exposed cassette into the discharge chamber, the numbering device comprising the disk 67 and the ratchet 68 is actuated to bring over window 42 a new number for the next film to be exposed. Said ratchet 68 is so set that the first film to be exposed is numbered 1, the second one 2, and so on, through the instrumentality of perforations 69 through the disk 67.

Said disk 67 is so arranged that a portion thereof projects over the corner of a film within the cassette 90 and the perforations 69 therein are photographed concurrently with the object reproduced upon the radiographic negative in a cassette 90.

The return of the handle 150 to its right hand position, Figure 2, does not disturb the marking mechanism just described, but reopens the shutters 180 and 181 and at the proper time connects the cassette carrying member 61 with the sled 71, the sled 71 concurrently being released from its locked position beneath the chamber 120 and pushed into end 41 out of the way so that the cassette receiving member 61 can be loaded again with a cassette 90 from the chamber 120.

This cycle of operations is repeated until the chamber 121 is filled, or partly filled, when said chamber may be removed by release of the spring catch at the side thereof. Chamber 120 may be removed at the same time or when empty and be refilled by the operator.

Many modifications of the device, as illustrated, may be had without departing from the spirit of the invention. It is quite manifest that it would be impossible to illustrate all forms which the invention might take. As an indication of the scope of the invention and that which is new, reference should be had to the appended claims.

What we claim is new and desire to procure by Letters Patent of the United States is:—

1. A magazine for a stack of cassettes, a second magazine, and conveying and discharge means therebetween comprising a carrier, a handle therefor, a trailer for said carrier adapted to be moved thereby a portion of the distance travelled by said carrier, and a lifting member for said cassettes adapted to be actuated by said carrier handle.

2. A serial roentgenogram device comprising a chamber for holding cassettes containing unexposed films, a receiver for said cassettes after the films therein are exposed and having catch means for retaining the cassettes therein, a carriage, a track for said carriage whereby cassettes are conveyed from said chamber to the receiver in a single plane, and means in said device and having an actuating element on said carriage for lifting said cassettes one at a time out of said carriage and into said receiver and beyond said catch means.

3. A serial roentgenogram device comprising a chamber for holding cassettes containing unexposed films, a receiver for said cassettes after the films therein are exposed and having catch means for retaining the cassettes therein, a carriage, a track for said carriage whereby cassettes are conveyed from said chamber to the receiver in a single plane, and means for lifting said cassettes one at a time out of said carriage and into said receiver and beyond said catch means, and in which said catch means comprise separable members adapted to be actuated as an incident to the movement of said cassettes with respect to said receiver.

4. A serial roentgenogram device comprising chambers for holding stacks of cassettes, intermediate conveying means having a manually actuated controlling member a movable support for one stack of cassettes adapted to be displaced as an incident to movement of said conveying means, and a conveyer discharge means adapted to be manually actuated by said controlling member.

5. A device for the production of serial roentgenograms comprising a magazine for containing a number of cassettes and having catch members for retaining the cassettes therein, a receiver for cassettes after exposure of the films contained therein and having catch members like those of said magazine, and a carrier comprising means for conveying cassettes from said magazine to said receiver, the casette therein being adapted to actuate said second mentioned catch members as an incident to its movement with said carrier.

6. A device for the production of serial roentgenograms comprising a magazine for containing a number of cassettes and having catch members for retaining the cassettes therein, a receiver for cassettes after exposure of the films contained therein and having catch members like those of said magazine, and a carrier comprising means for conveying cassettes from said magazine to said receiver, the cassette therein being adapted to actuate said second mentioned catch members as an incident to its movement with said carrier, said magazine and said receiver being interchangeable.

7. A standard, a device for the production of serial roentgenograms, and a holder for cassettes to be used in said device and normally operable to discharge said cassettes by gravity, said device being mounted on said standard and adapted to be adjusted to a plurality of angular positions, and said holder having means for urging the cassettes therefrom when the adjustment of said device is such that gravity fails to cause the discharge of cassettes from said holder.

8. A device for the production of serial roentgenograms comprising a body, a magazine on said body for containing a number of cassettes, a receiver on said body for cassettes after exposure of the films therein, means for conveying unexposed cassettes from said magazine to a position for exposure and to said receiver, a truck at each side of said body and having wheels at angles to one another, and an adjustable supporting member for said body having rails for engaging said angularly disposed wheels.

9. A magazine roentgenogram device comprising a body, a magazine for cassettes containing unexposed films, a magazine for cassettes containing exposed films, and an intermediate portion to receive cassettes for exposure, said intermediate portion including a fluoroscopic screen adapted to function when no cassette is in a position for exposure, and in which shutters are provided for covering said fluoroscopic screen when a cassette is in position for exposure.

10. A serial roentgenogram device comprising a body, a fluoroscopic window in said body, magazines for cassettes at opposite sides of said window, a carriage intermediate said magazines and adapted to register with said window when an exposure of a cassette is desired, shutters for said window, and a cassette discharging member.

11. A serial roentgenogram device as described in claim 10, and in which said carriage is provided with means for actuating said shutters.

12. A serial roentgenogram device as described in claim 10, and in which said carriage is provided with a handle adapted to manipulate said carriage and actuate said cassette discharging member.

13. A serial roentgenogram device as described in claim 10, and in which said carriage is provided with a handle adapted to move said carriage and actuate said discharge means, and said body is provided with a slot to receive said handle, said slot determining the lateral movements of said handle to indicate registry of the cassette and window and to admit of the discharge of said cassette.

14. The combination with two separated magazines for cassettes or plate holders, of a carriage adapted to convey a cassette or plate holder from one magazine to the other, and a trailer for said carriage movable therewith, said trailer being adapted to be moved into registry with one of said magazines to prevent the discharge of a cassette or plate holder therefrom while said carriage is intermediate said magazines or in juxtaposition to said other magazine.

15. The combination with two separated magazines for cassettes or plate holders, of a carriage adapted to convey a cassette or plate holder from one magazine to the other, and a trailer for said carriage movable therewith, said trailer being adapted to be moved into registry with one of said magazines to prevent the discharge of a cassette or plate holder therefrom while said carriage is intermediate said magazines or in juxtaposition to said other magazine, and in which said carriage and said trailer are separable, and are adapted to be separated and coupled as an incident to movement of said carriage.

16. The combination with two separated magazines for cassettes or plate holders, of a carriage adapted to convey a cassette or plate holder from one magazine to the other, and a trailer for said carriage movable therewith, said trailer being adapted to be moved into registry with one of said magazines to prevent the discharge of a cassette or plate holder therefrom while said carriage is intermediate said magazines or in juxtaposition to said other magazine, and in which said carriage and said trailer are separable and are adapted to be moved over a cam, said trailer having a spring actuated coupler adapted to engage said carriage and being adapted to impinge said cam to release said coupler from said carriage.

17. A serial roentgenogram device comprising a magazine for cassettes containing unexposed films, a magazine for cassettes containing exposed films, a window for the fluoroscopic inspection of an object to be photographed, a carriage for conveying cassettes from one magazine to the other and adapted to register with said window to permit of the exposure of a film contained in a cassette carried therein, a trailer for said carriage and having a coupler adapted to releasably engage said carriage, and a coupler disengaging member for disjoining said carriage and said trailer.

18. The device as described in claim 17, and in which said trailer comprises a plurality of roller bearings adapted to impinge the outermost cassette in the magazine for unexposed cassettes and to maintain said cassette in a position whereby to permit of said carriage passing freely into registry therewith.

19. A serial roentgenogram device comprising separated magazines, a carriage adapted to carry cassettes from one magazine to the other, a discharge means for a cassette carried by said carriage, said magazines being interchangeable and having similar cassette retaining members, and means for rendering said cassette retaining members idle in one magazine and in operable position in the other.

20. A device for the production of serial roentgenograms comprising a body having a slot to receive a carriage actuating handle, a magazine for cassettes containing unexposed films at one end of said body, a magazine for cassettes containing exposed films at the other end thereof, a fluoroscopic window intermediate said magazines, shutters for said fluoroscopic window, a carriage for conveying cassettes from one magazine to the other and adapted to close said shutters when a cassette is placed in position for exposure in registry with said window, a cassette discharge means, a trailer for said carriage and adapted to prevent discharge of cassettes from said magazine containing cassettes with unexposed films except when said cassettes are deposited in said carriage, and an operable handle for said carriage and adapted to be moved longitudinally and laterally in said slot in said body, said handle being adapted to engage said cassette discharge means and discharge a cassette from said carriage into said magazine for cassettes containing exposed films.

21. The device described in claim 17, and in which said coupler disengaging member includes a support on said body operative while said carriage and trailer are disconnected to maintain said coupler in a position to readily engage said carriage when said carriage is moved into position for engagement with said coupler.

22. A serial roentgenogram device having chambers for holding cassettes, one of said chambers possessing catch means for retaining cassettes therein, means for conveying cassettes from one chamber to the other and comprising a carrier and a straight track from one chamber to the other, said carrier when conveying a cassette discharged out of one of said chambers and discharging said cassette into the other of said chambers positioning and moving said cassette to actuate said catch means, and means for forcing cassettes one at a time inwardly of said last mentioned chamber and beyond said catch means.

23. A serial roentgenogram device comprising a body, magazines having catch members, carrier means between said magazines, and a trailer detachably associated with said carrier, the catch members on one of said magazines being releasable to allow the discharge of cassettes therefrom, said detachable trailer preventing the discharge of cassettes from said loading magazine when said carrier is removed from said loading magazine, and said carrier being adapted when carrying a cassette to force said cassette into engagement with the catches on the other magazine to render said catches inoperable.

24. In a device for the production of serial roentgenograms and having a body, a magazine detachably secured to said body and adapted to completely enclose a stack of cassettes, said magazine having a frame possessing anchor holding means for its attachment to said body, a follower, means for urging said follower, and a manually actuated stop for said follower comprising a member secured thereto and adapted to engage said anchor holding means.

25. A serial roentgenogram device comprising a standard, a carriage on said standard, a frame adjustably secured upon said carriage, a cassette magazine having a cassette actuating means, a cassette receiving device adjacent said magazine for holding a cassette after exposure, said magazine and said receiving device being disposed on said frame and cassette discharge means movably disposed on said frame, the cassette actuating member in said magazine being adapted to be rendered inoperable when the cassettes contained in said magazine may be caused to move by gravity.

26. A device for the production of serial roentgenograms comprising a magazine having catch members and for containing a number of cassettes therein, a receiver for cassettes after exposure of the films contained therein and having catch members like those of said magazine, and a carrier comprising means for conveying cassettes from said magazine to said receiver, the cassette therein being adapted to actuate said second mentioned catch members as an incident to its movement with said carrier, said magazine and said receiver being interchangeable and the catches in one of said magazines being releasable to supply said carrier with cassettes.

27. In combination, a frame having rails, an instrumentality adapted to be freely moved upon said rails and having a lock engaging lug and a lock member substantially surrounding and releasably disposed upon one of said rails and having a portion provided with a set screw and another portion cooperating with said lock engaging lug of said body to prevent movement of said instrumentality along said rails.

JULIUS B. WANTZ.
JULIUS J. GROBE.